United States Patent [19]

Susuki et al.

[11] Patent Number: 5,430,650
[45] Date of Patent: Jul. 4, 1995

[54] METHOD AND APPARATUS FOR REAR-WHEEL STEERING CONTROL

[75] Inventors: Yuta Susuki, Tokyo; Katsushi Matsuda, Yokohama, both of Japan

[73] Assignee: Mitsubishi Jidosha Kogyo Kabushiki Kaisha, Tokyo, Japan

[21] Appl. No.: 287,921

[22] Filed: Aug. 9, 1994

[30] Foreign Application Priority Data

Aug. 10, 1993 [JP] Japan .................. 5-198190
Sep. 16, 1993 [JP] Japan .................. 5-230265

[51] Int. Cl.⁶ ............................ B62D 5/26
[52] U.S. Cl. ................... 364/424.05; 180/24.01; 180/140; 280/91
[58] Field of Search .............. 364/424.01, 424.05, 364/424.07, 565; 180/24.01, 140, 144, 162; 280/119, 137, 91

[56] References Cited

U.S. PATENT DOCUMENTS

| 4,947,326 | 8/1990 | Mori et al. | 364/424.05 |
| 4,998,201 | 3/1991 | Mori | 364/424.05 |
| 5,010,488 | 4/1991 | Ohshita et al. | 364/424.05 |
| 5,180,026 | 1/1993 | Mori | 180/140 |
| 5,317,513 | 5/1994 | Mouri | 364/424.05 |
| 5,320,192 | 6/1994 | Hayashida et al. | 180/140 |
| 5,366,035 | 11/1994 | Hayashida et al. | 180/24.01 |

FOREIGN PATENT DOCUMENTS 61-18568 1/1986 Japan .
2-81771 3/1990 Japan .

Primary Examiner—Michael Zanelli

[57] ABSTRACT

A rear-wheel steering control apparatus includes a controller, which performs a first-order lag process. This process is equivalent to a first-order lag transfer function and is represented by a time constant matching loadage data from a rear-wheel stroke sensor and a proportional constant matching vehicle speed data from a vehicle speed sensor. The first-order lag process is performed on a front-wheel steering angle, obtained based on steering-wheel angle data from a steering-wheel angle sensor, to thereby set a target rear-wheel steering angle. Steering of rear wheels to the set rear-wheel steering angle is carried out with a degree of first-order response delay corresponding to the loadage. Thereby, traveling stability and forepart turning performance of a vehicle are improved in various loading and steering conditions.

18 Claims, 6 Drawing Sheets

METHOD AND APPARATUS FOR REAR-WHEEL STEERING CONTROL

BACKGROUND OF THE INVENTION

1. Field of the Invention

The present invention relates to a method and apparatus for controlling the steering of the rear wheels of a motor vehicle.

2. Description of the Related Art

In order to improve the maneuverability and stability of a motor vehicle, it is known in the art to steer all of the front and rear wheels in accordance with an operation of the steering wheel. In a typical example of four-wheel steering, the rear wheels are steered to the same phase side as the front wheels when the vehicle is turning in medium- or high-speed region. According to the four-wheel steering, the swerving motion of the vehicle (the turning motion of the forepart) is converted to lateral or side-to-side motion and thus the influence of the moment of inertia lessens, whereby the response delay and tail swing (yawing) during turning of the vehicle are reduced, improving the vehicle traveling stability.

However, even if the four-wheel steering technique is employed, the vehicle traveling stability can be lowered when the load weight of the vehicle is increased. This is because the ground load on the rear-wheel side is great as compared with the front-wheel side.

To avoid such a lowering of the traveling stability attributable to increase in the load weight, it is known to increase the steering ratio (the ratio of the rear-wheel steering angle to the front-wheel steering angle) with increase in the load weight, as disclosed in Examined Japanese Patent Publication (KOKOKU) No. 5-25710.

In Unexamined Japanese Patent Publication (KOKAI) No. 2-81771 is disclosed an apparatus for obtaining a target rear-wheel steering angle $\theta r^*$ according to the formula $\theta r^* = (a.\theta f(t) + b.\theta f(t-\Delta t))/(a+b)$. In this apparatus, as the load weight increases, the value of the coefficient "a" is increased and at the same time the value of the coefficient "b" is decreased. Consequently, when the load weight is small, the rate of the steering quantity component $b.\theta f(t-\Delta t)/(a+b)$, which is delayed from the front-wheel steering by time $\Delta t$, with respect to the target rear-wheel steering angle $\theta r^*$ becomes greater, thereby increasing the steering response of the vehicle. When the load weight is large, on the other hand, the rate of the steering quantity component $a.\theta f(t)/(a+b)$, which has no delay with respect to the front-wheel steering, becomes greater. This thereby restrains collapse of the goods on the vehicle and prevents passengers from receiving an uncomfortable feeling.

However, if the rear-wheel steering angle is increased with increase in the load weight, as in Japanese Patent Publication(Kokoku) No. 5-25710, the side-to-side motion component of the vehicle increases while the swerving (turning) motion component decreases. This potentially spoils the steering feeling (making the driver feel it difficult to turn). Further, energy consumption increases.

In Japanese Patent Publication(Kokoku) No. 2-81771, the substantial response delay time for the rear-wheel steering is shortened as the load weight increases. This thereby controls the steering response (yaw response) of the vehicle in accordance with the load weight. When the load weight is small, however, the steering response becomes unnecessarily high even if the driver slowly operates the steering wheel. On the other hand, when the load weight is large, high steering response is not available even if the driver quickly operates the steering wheel. Thus, in these known systems, the steering response changes only uniformly in accordance with the load weight, and the driver's steering operation (steering frequency) is not at all taken into consideration.

SUMMARY OF THE INVENTION

An object of the present invention is to provide a rear-wheel steering control method and apparatus capable of improving both the traveling stability and forepart turning performance of a motor vehicle in various loading and steering conditions.

According to a first mode of the present invention, a rear-wheel steering control apparatus comprises front-wheel steering angle detecting means for detecting a steering angle of front wheels, movable load detecting means for detecting a movable load of a vehicle, rear-wheel steering means for steering rear wheels, and control means for controlling operation of the rear-wheel steering means in accordance with the detected steering angle and the detected movable load to steer the rear wheels in a phase direction identical to that of the front wheels, wherein the control means sets a rear-wheel steering angle matching with the front-wheel steering angle, and sets a first-order lag with which response of the set rear-wheel steering angle is delayed with respect to a steering of the front wheels such that a degree of the first-order response delay decreases with an increase in the detected movable load.

Preferably, the control means controls operation of the rear-wheel steering means in accordance with the front-wheel steering angle $\theta f$ and by means of a transfer function $G(s)$, and sets an output $\theta r$ for the rear-wheel steering means to $\theta r = G(s).\theta f$. The transfer function $G(s)$ is given by $G(s) = K/(1+Ts)$, wherein K is a proportional constant, T is a delay time constant, and s is a Laplace operator. The control means decreases the time constant T in accordance with the movable load.

Still further preferably, the rear-wheel steering control apparatus further comprises vehicle speed detecting means for detecting a speed of the vehicle. The control means increases the proportional constant K with an increase in the detected vehicle speed or with an increase in the detected movable load.

Also, the movable load detecting means preferably detects a load on a rear axle or a load factor of the vehicle.

According to another mode of the present invention, there is provided a rear-wheel steering control method for steering rear wheels of a vehicle in a phase direction identical to that of front wheels. The rear-wheel steering control method comprises the steps of: (a) detecting a steering angle of the front wheels; (b) detecting a movable load of the vehicle; (c) setting a rear-wheel steering angle matching with the front-wheel steering angle, and setting a first-order lag with which response of the set rear-wheel steering angle is delayed with respect to a steering of the front wheels such that a degree of the first-order response delay decreases with an increase in the detected movable load; and (d) steering the rear wheels in accordance with an output obtained in the step (c).

Preferably, the step (c) includes generating an output $\theta r$ in accordance with the front-wheel steering angle $\theta f$ and by means of a transfer function G(s), and setting the output $\theta r$ to $\theta r = G(s) \cdot \theta f$. The transfer function G(s) is given by $G(s) = K/(1+Ts)$, wherein K is a proportional constant, T is a delay time constant, and s is a Laplace operator. The time constant T is decreased in accordance with a decrease in the detected movable load.

Still further preferably, the rear-wheel steering control method further comprises the step of detecting a speed of the vehicle. The step (c) includes increasing the proportional constant K with an increase in the detected vehicle speed or with an increase in the detected movable load.

Also, the step (b) preferably includes detecting a load on a rear axle or a load factor of the vehicle.

The present invention has an advantage in that the degree of first-order response delay of rear-wheel steering with respect to front-wheel steering is variably set in accordance with the detected movable load, whereby both the traveling stability and forepart turning performance of the vehicle can be improved in various loading and steering conditions.

Specifically, when the movable load or loadage is small, the degree of first-order response delay of rear-wheel steering is set to, e.g., a large value, whereby the time elapsed from the front-wheel steering, until the rear-wheel steering angle reaches the set steering angle, is prolonged. In other words, the vehicle in this case has mobility performance equivalent to that of a front-wheel-steering vehicle. Thus, the component of forepart turning motion of the vehicle is not reduced by rear-wheel steering, thereby improving the turning performance of the vehicle. Further, since the loadage of the vehicle is small, the traveling stability of the vehicle is not excessively lowered by the delay of rear-wheel steering. Furthermore, not only the first-order lag (i.e., the time lag of first order) is set but also the degree of the first-order lag is controlled. Therefore, when the driver slowly operates the steering wheel, the delay time becomes shorter and the forepart turning performance is not unnecessarily increased, thereby ensuring high turning stability.

On the other hand, when the detected load is great, the degree of the first-order response delay of rear-wheel steering is set to, e.g., a small value, and thus the rear wheels are steered quickly. Consequently, the component of the forepart turning motion of the vehicle is lessened, thereby enhancing the traveling stability of the vehicle. However, the turning performance of the vehicle is not low as compared with the case where the rear-wheel steering angle is increased with an increase in the loadage. Further, the first-order lag is set and the degree of the first-order lag is controlled. Therefore, when the driver quickly operates the steering wheel, the delay time is prolonged. This thus ensures proper forepart turning performance responsive to steering conditions.

In a preferred mode of the present invention, the rear-wheel steering angle output $\theta r$ corresponding to the front-wheel steering angle input $\theta f$ is given by the first-order lag transfer function $G(s) = K/(1+Ts)$, and the time constant T is decreased with an increase in the detected loadage. Accordingly, the time constant T, and thus the degree of the first-order lag of rear-wheel steering, varies in accordance with the loadage, whereby the degree of the first-order response delay of the rear-wheel steering can be matched with the loadage. Namely, when the detected loadage is small, the degree of the first-order lag increases to improve the forepart turning performance of the vehicle; when the detected loadage is great, the degree of the first-order lag decreases to improve the traveling stability of the vehicle.

According to another preferred mode of the present invention, the proportional constant K, and thus the steering ratio of the front and rear wheels, increases with an increase in the vehicle speed. Thereby, the skid angle of the vehicle is reduced in medium- and high-speed region and the forepart turning performance of the vehicle is improved.

In still another preferred mode of the present invention, the proportional constant K is increased with an increase in the detected loadage, whereby the traveling stability of the vehicle at high load can be improved.

According to the preferred mode in which the proportional constant K is varied in accordance with both the vehicle speed and the loadage, the influence of variation in the loadage upon the operational characteristics of the vehicle is reduced. Thereby, the vehicle traveling stability can be further improved.

Furthermore, in the preferred mode in which the load factor or the load acting on the rear axle of the vehicle is detected as the loadage, the loadage can be relatively easily and properly detected.

These and other objects and advantages will become more readily apparent from an understanding of the preferred embodiments described below with reference to the following drawing figures.

BRIEF DESCRIPTION OF THE DRAWINGS

The invention will become more fully understood from the detailed description given herein below with reference to the accompanying figures, given by way of illustration only and not intended to limit the present invention in which.

DETAILED DESCRIPTION

A rear-wheel steering control apparatus according to a first embodiment of the present invention will be described.

Figure 1:
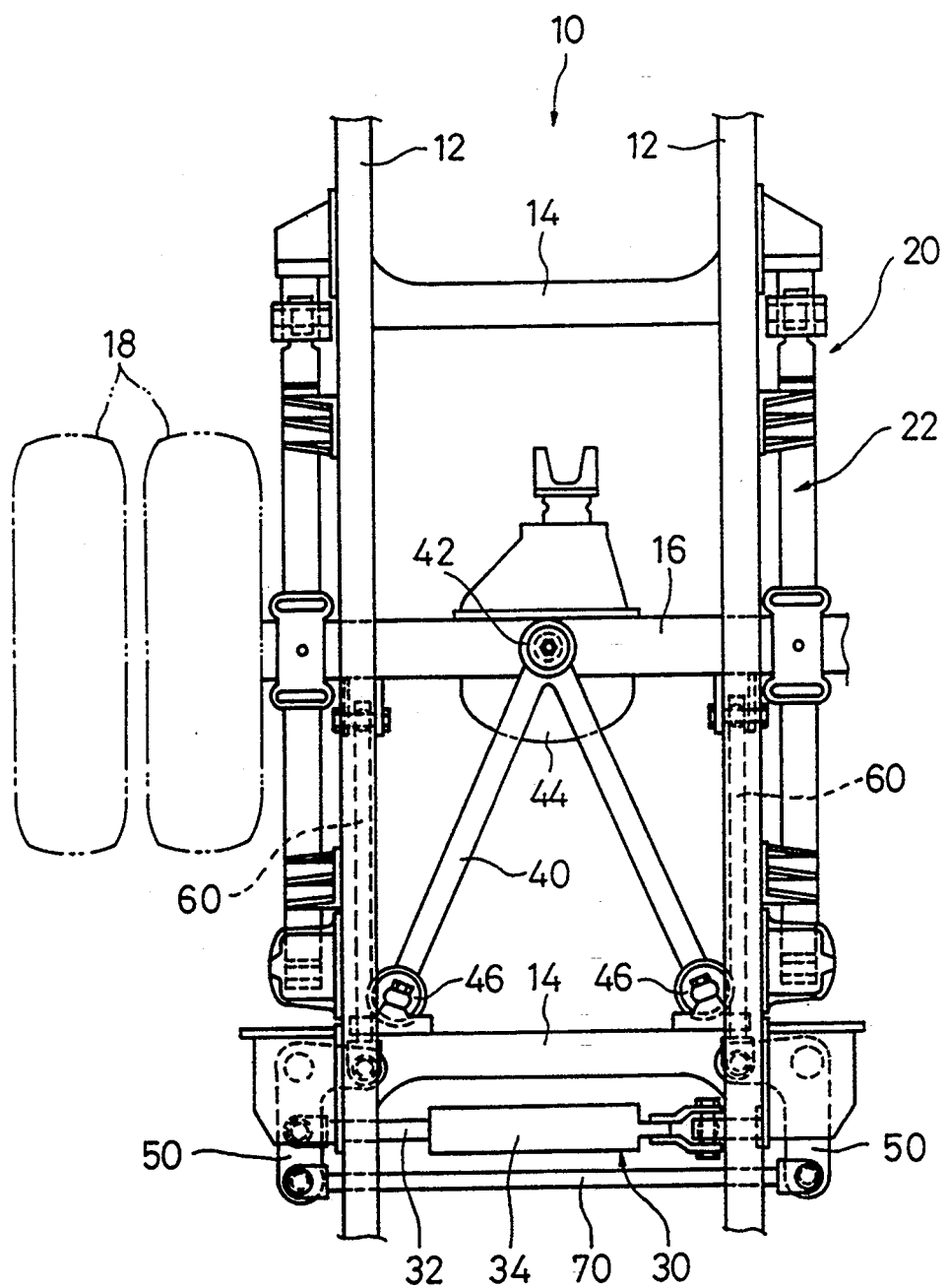
FIG. 1 is a partial plan view showing a principal part of a rear-wheel steering mechanism, along with its peripheral elements, of a rear-wheel steering control apparatus according to a first embodiment of the present invention.
Figure 2:
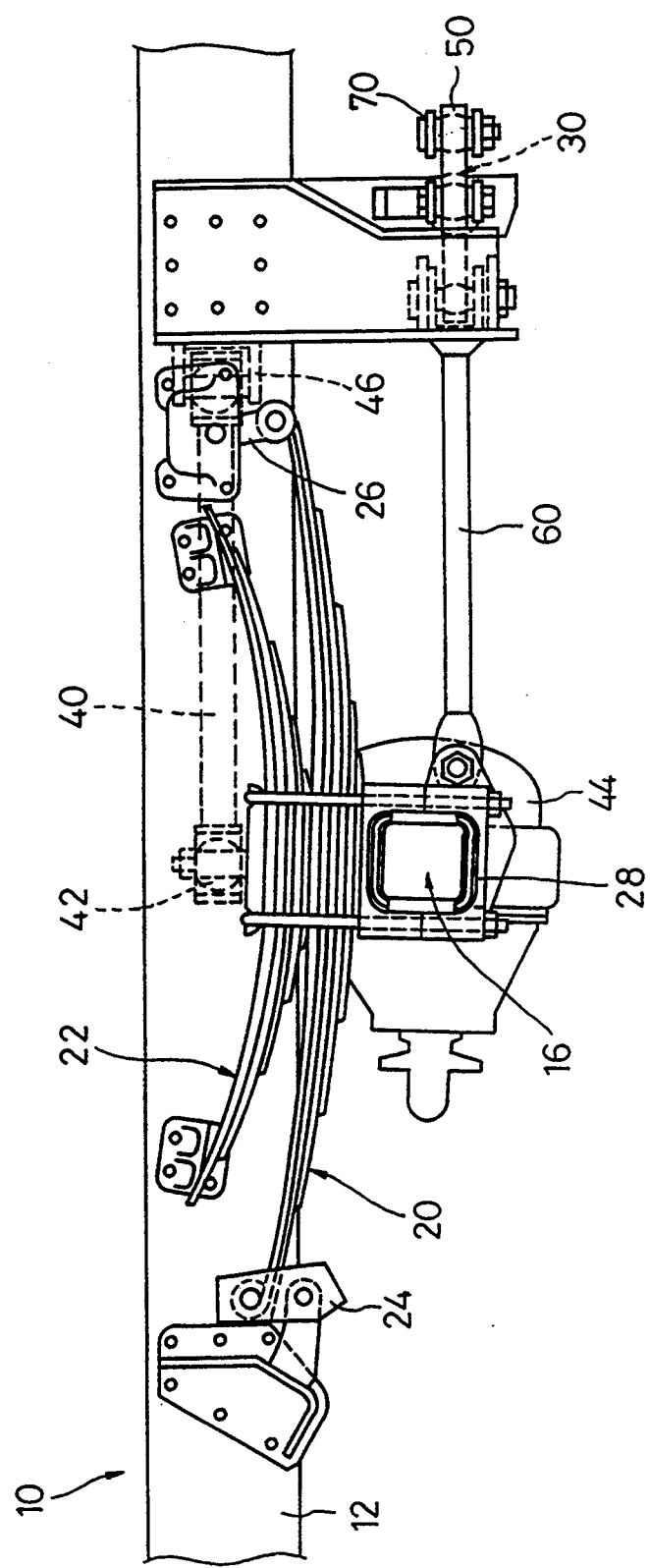
FIG. 2 is a partial side view of the principal part of the rear-wheel steering mechanism and the peripheral elements shown in FIG. 1.

Referring first to FIGS. 1 and 2, a motor vehicle to which the rear-wheel steering control apparatus is installed, for example, a truck, has a chassis frame 10, which includes right and left side rails 12 and a plurality of cross members 14 each having opposite ends secured to the respective side rails 12. Each of the right and left side rails 12 supports front and rear ends of a main leaf spring 20 via shackle links 24 and 26, respectively. Reference numeral 16 denotes a rear axle housing rotatably supporting rear wheels 18 of the truck.

The rear axle housing 16 is turned by a rear-wheel steering mechanism, described later, about a center of rotation thereof which lies on the longitudinal center line of the truck, whereby the rear wheels 18 are steered. In connection with the rear-wheel steering, the axle housing 16 has opposite ends supported by the main leaf springs 20 and helper leaf springs 22 arranged above the springs 20, via rubber pad members 28, respectively. Thus, the axle housing 16 is displaceable relative to the leaf springs 20.

The rear-wheel steering mechanism comprises a hydraulic cylinder device 30 as a wheel steering actuator, an upper radius rod 40 having a V-shape as viewed in plan, the vertex of the V-shape being the center of rotation of the rear axle housing 16, and a mechanism for converting displacement of a piston rod 32 of the hydraulic cylinder device 30 to turning motion of the axle housing 16.

More specifically, the upper radius rod 40 of the rear-wheel steering mechanism is arranged between the right and left side rails 12 in such a manner that the vertex of the V-shaped rod 40 is pivotally connected via a ball joint 42 to a differential case 44 arranged at a central portion of the rear axle housing 16. Further, free ends of the right and left legs of the rod 40 are pivotally connected to the right and left side rails 12 via ball joints 46, respectively. Right and left lower radius rods 60, which form a main part of the motion converting mechanism in cooperation with L-shaped levers 50, each have one end pivotally connected via a ball joint to a corresponding one of brackets arranged at the lower part of the axle housing 16 on opposite sides thereof, and have the other end pivotally connected to a distal end of the lateral arm of a corresponding one of the L-shaped levers 50 via a ball joint. The bent portion of each lever 50 is pivotally coupled to a bracket secured to the corresponding side rail 12. A connecting rod 70 has opposite ends pivotally coupled to rear ends of longitudinal arms of the respective L-shaped levers 50 via ball joints.

A piston shaft 32 of the hydraulic cylinder device 30 is coupled via a ball joint to, e.g., an intermediate portion of the longitudinal arm of the L-shaped lever 50 on the left side. A cylinder 34 of the cylinder device 30 is supported on a bracket of the chassis frame 10 by means of a ball joint.

Figure 3:
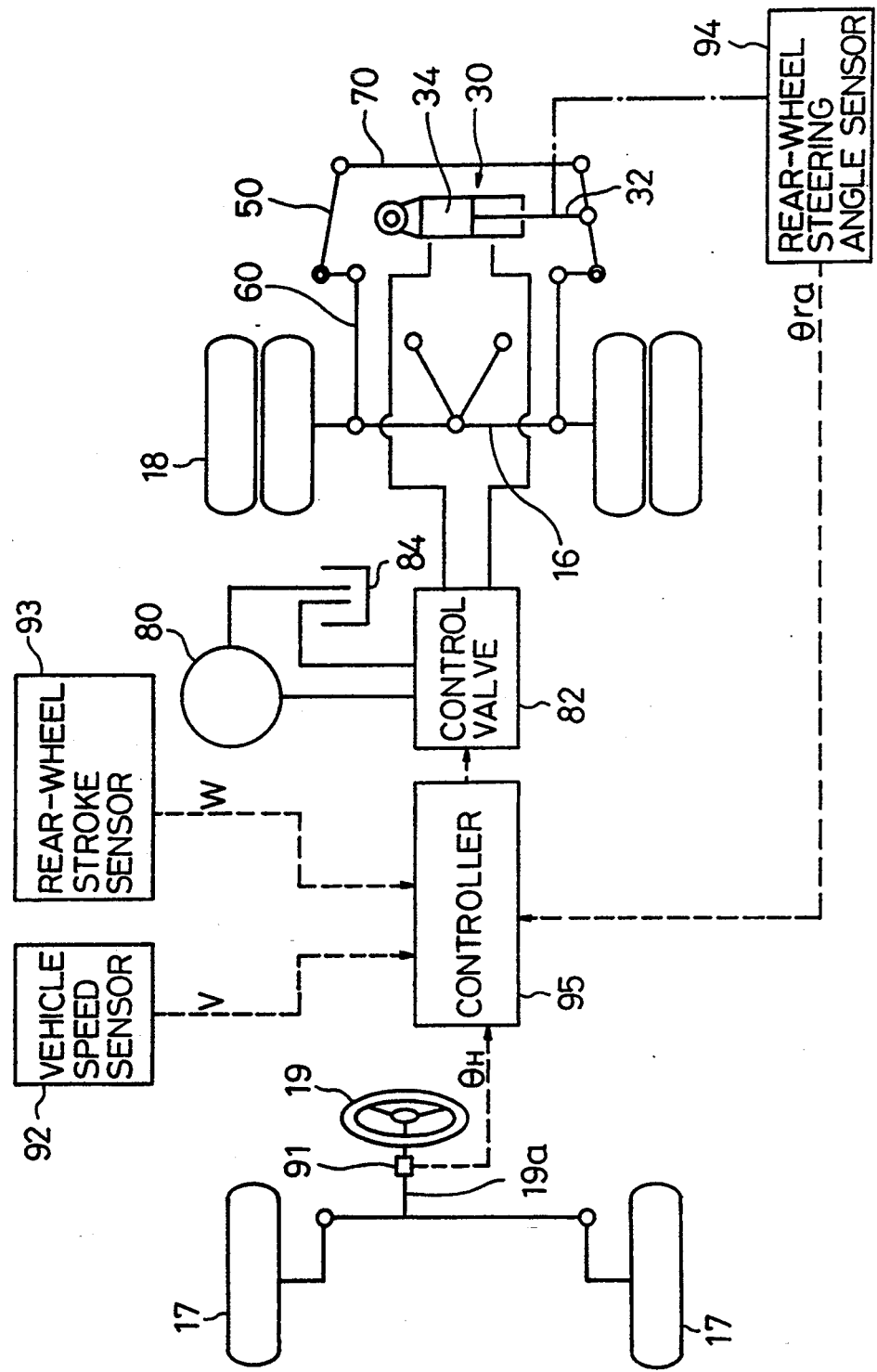
FIG. 3 is a schematic diagram showing a hydraulic system, sensor system and control system of the rear-wheel steering mechanism, of which the principal part is shown in FIGS. 1 and 2.

The rear-wheel steering mechanism further comprises a hydraulic pump 80 and a control valve 82, shown in FIG. 3, and controls the supply of hydraulic pressure from the hydraulic pump 80 to each of right and left cylinder chambers of the cylinder 34 by means of the control valve 82.

In addition to the rear-wheel steering mechanism constructed as described above, the rear-wheel steering control apparatus further comprises, as shown in FIG. 3, an optical pulse, non-contact type steering-wheel angle sensor 91, for example, mounted on a steering shaft 19a for detecting the angle of the steering wheel, a vehicle speed sensor 92 for detecting the vehicle speed, a rear-wheel stroke sensor 93 for detecting the load applied to the rear axle as a loadage (movable load) of the truck, a rear-wheel steering angle sensor 94 for detecting the stroke position of the piston rod 32 of the hydraulic cylinder device 30 as a rear-wheel steering angle, and a controller 95. In FIG. 3, reference numeral 17 denotes the front wheels of the truck, and 19 denotes the steering wheel of the same.

The controller 95 includes a processor, memories, input/output circuits, etc. (none of which are shown), is connected to the sensors 91 to 94 at an input side thereof, and connected to the control valve 82 of the rear-wheel steering mechanism at an output side thereof. The controller 95 has the function of controlling the operation of the rear-wheel steering mechanism through control of the actuation of the control valve 82, and the function of setting a target rear-wheel steering angle.

Figure 4:
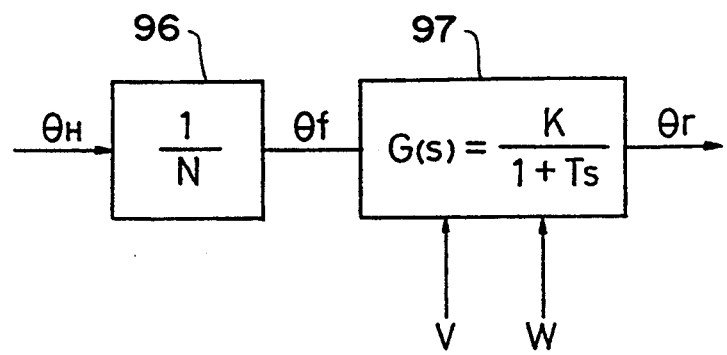
FIG. 4 is a block diagram illustrating the rear-wheel steering angle setting function of a controller shown in FIG. 3.

As shown in FIG. 4, the controller 95 as the rear-wheel steering angle setting section has a front-wheel steering angle calculating section 96 and a rear-wheel steering angle calculating section 97. The front-wheel steering angle calculating section 96 is supplied with a steering-wheel angle $\theta_H$ detected by the steering-wheel angle sensor 91, and calculates a front-wheel steering angle $\theta f$ by dividing the steering-wheel angle $\theta_H$ by a steering gear ratio N.

The rear-wheel steering angle calculating section 97 is supplied with the front-wheel steering angle $\theta f$ calculated in the above manner, as well as a vehicle speed V and a loadage W from the vehicle speed sensor 92 and the rear-wheel stroke sensor 93, respectively. The rear-wheel steering angle calculating section 97 calculates a target rear-wheel steering angle $\theta r$, which represents an angle of steering in the same phase direction as the front-wheel steering angle $\theta f$ and which matches with the angle $\theta f$, according to the formula $\theta r = G(s) \cdot \theta f$. In the formula, symbol $G(s)$ is a transfer function representing a response of the rear-wheel steering angle $\theta r$ to the front-wheel steering angle input $\theta f$, and symbol s is a Laplace operator. Provided the proportional constant and the delay time constant are K and T, respectively, the transfer function $G(s)$ is given by the equation $G(s) = K/(1 + Ts)$.

Figure 5:
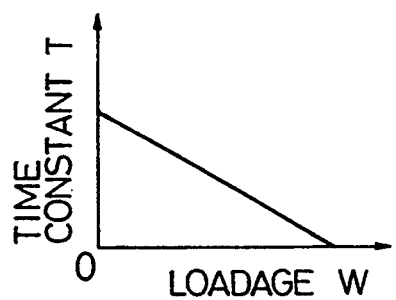
FIG. 5 is a graph showing an example of a loadage-time constant map used in the calculation of a time constant T at a rear-wheel steering angle calculating section in FIG. 4.

Specifically, the rear-wheel steering angle calculating section 97 obtains a time constant T corresponding to the loadage W, by referring to a loadage-time constant map. As shown in FIG. 5 by way of example, the loadage-time constant map is set such that the time constant T decreases with increase in the loadage W. The time constant T is set variably within a range of "0" to "1.0", for example.

Subsequently, the rear-wheel steering angle calculating section 97 subjects the front-wheel steering angle $\theta f$ to first-order lag process, by using the time constant To For example, the calculation indicated by the equation below is performed as the first-order lag process.

$$\theta f'(n) = T \times \theta f'(n-1) + (1-T) \times \theta f$$

where θf'(n) and θf'(n−1) represent first-order-lagged front-wheel steering angles which are obtained in present and preceding cycles of the first-order lag process, respectively, and on which the first-order lag process has been performed.

Rearranging the above equation provides θf'(n)=T(θf'(n−1)−θf)+θf. Since this equation contains a component proportional to (θf'(n−1)−θf), the first-order-lagged front-wheel steering angle θf'(n) evidently corresponds to the steering speed (steering frequency) of the front wheels.

Figure 6:
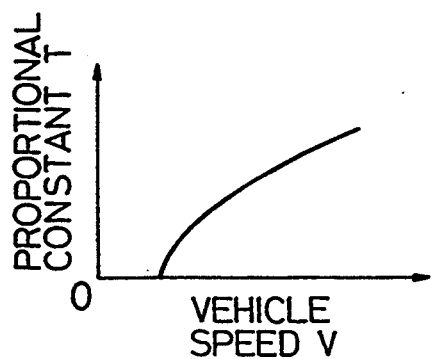
FIG. 6 is a graph showing an example of a vehicle speed-proportional constant map used in the calculation of a proportional constant K at the rear-wheel steering angle calculating section.

Then, referring to a vehicle speed-proportional constant map, the rear-wheel steering angle calculating section 97 obtains a proportional constant K corresponding to the vehicle speed V. As shown in FIG. 6 by way of example, the vehicle speed-proportional constant map is set such that in medium- and high-speed regions higher than a predetermined vehicle speed, e.g., about 30 km/h, the proportional constant K increases with increase in the vehicle speed V. The proportional constant K is set variably within a range of about "0" to "0.3", for example.

Further, the rear-wheel steering angle calculating section 97 obtains a target rear-wheel steering angle θr by multiplying the first-order-lagged front-wheel steering angle θf', which is obtained in the present cycle of first-order lag process, by the proportional constant K.

The controller 95 as the control section for controlling the operation of the rear-wheel steering mechanism drives the control valve 82 of the rear-wheel steering mechanism in such a manner that the deviation of an actual rear-wheel steering angle θra, detected by the rear-wheel steering angle sensor 94, from the target rear-wheel steering angle θr becomes zero. Consequently, the rear wheels are steered in the same phase direction as the front wheels by an angle corresponding to the front-wheel steering angle.

The operation of the rear-wheel steering control apparatus constructed as described above will now be explained.

During travel of the truck equipped with the rear-wheel steering control apparatus, the steering-wheel angle $\theta_H$, vehicle speed V, loadage W and actual rear-wheel steering angle θra are detected, respectively, by the steering-wheel angle sensor 91, vehicle speed sensor 92, rear-wheel stroke sensor 93, and rear-wheel steering angle sensor 94. The controller 95, on the other hand, periodically executes a control program (FIG. 7) for setting the target rear-wheel steering angle and controlling the operation of the rear-wheel steering mechanism.

Figure 7:
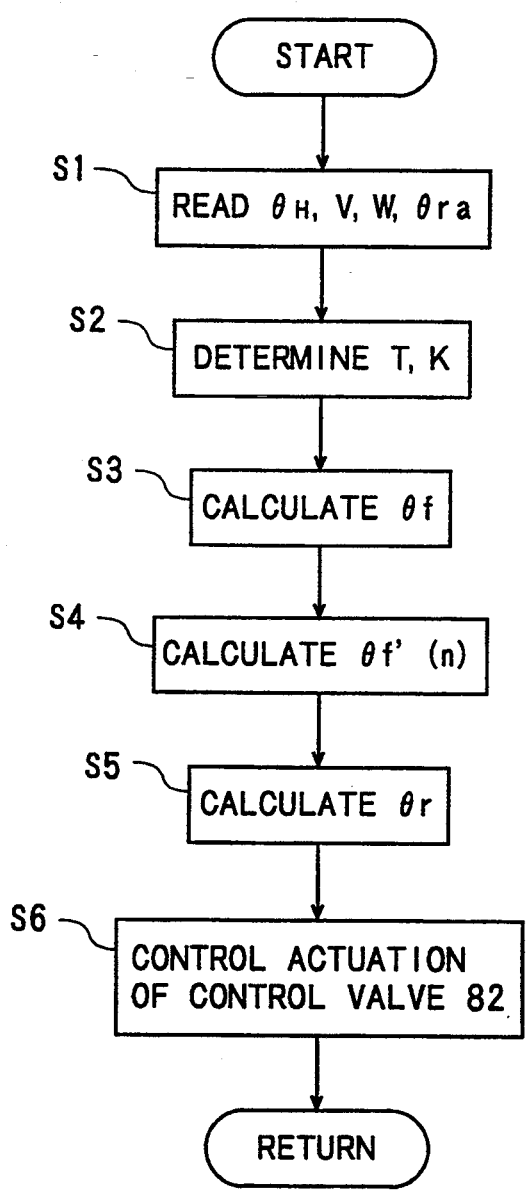
FIG. 7 is a flowchart showing a control program executed by the controller 95 in FIG. 3 for setting a target rear-wheel steering angle and controlling the operation of the rear-wheel steering mechanism.

In each cycle of execution of the control program shown in FIG. 7, the controller 95 first reads the sensor outputs $\theta_H$, V, W and θra (Step S1), and then obtains a time constant T matching with the loadage W by referring to the loadage-time constant map (FIG. 5), as well as a proportional constant K matching with the vehicle speed V by referring to the vehicle speed-proportional constant map (FIG. 6) (Step S2).

Subsequently, the controller 95 calculates the front-wheel steering angle θf by dividing the steering-wheel angle $\theta_H$, read in Step S1, by the steering gear ratio N. Further, using the time constant T obtained in Step S2, the front-wheel steering angle θf obtained in Step S3, and the first-order-lagged front-wheel steering angle θf'(n−1) which is obtained in the preceding cycle of first-order lag process, the controller 95 obtains the first-order-lagged front-wheel steering angle θf'(n) of the present cycle, according to the equation θf'(n)=T×θf'(n−1)+(1−T)×θf (Step S4). Namely, the first-order lag process is performed on the front-wheel steering angle θf by using the time constant T. Then, a target rear-wheel steering angle θr is obtained by multiplying the first-order-lagged front-wheel steering angle θf'(n) by the proportional constant K obtained in Step S2 (Step S5).

To control the operation of the rear-wheel steering mechanism, the controller 95 obtains a deviation of the actual rear-wheel steering angle θra, read in Step S1, from the target rear-wheel steering angle θr obtained in Step S5. It then derives a control output such that the deviation becomes zero. Finally, it sends the control output to the control valve 82 to control the actuation thereof (Step S6).

When the control valve 82 is driven, high-pressure operating oil discharged from the hydraulic pump 80 is supplied to a corresponding one of the right and left cylinder chambers of the cylinder 34, while the operating oil in the other cylinder chamber is discharged to the oil tank 84. Alternatively, the oil pressures applied to the right and left cylinder chambers are controlled to respective different values. As a result, a pressure difference is caused between the two cylinder chambers, whereby the piston rod 32 projects from or retracts into the cylinder 34. Namely, the cylinder device 30 extends or contracts. Consequently, the rear wheels 18 of the truck are steered such that the steering angle thereof decreases or increases.

More specifically, when the cylinder device 30 extends, for example, the L-shaped lever 50 on the left side in FIG. 1 turns clockwise; therefore, the lower radius rod 60 on the left side in the figure is pulled toward the rear of the truck. Simultaneously, the right L-shaped lever 50, which is coupled to the left L-shaped lever 50 by the connecting rod 70, turns clockwise, whereby the lower radius rod 60 on the right side in the figure is pushed toward the front of the truck. As a result, the axle housing 16 turns about the ball joint 42 arranged at the vertex of the V-shape formed by the upper radius rod 40, and thus the rear wheels 18 are steered.

When time to execute the control program next is reached after the execution of the aforementioned Step S6, the controller 95 again executes the control program of FIG. 7 from Step S1.

According to the rear-wheel steering described above, when the loadage of the truck is small, the first-order lag process is performed on the front-wheel steering angle θf by using a large time constant T. Therefore, the degree of response delay of the rear-wheel steering with respect to the operation of the steering wheel increases. Thus, the timing for starting the rear-wheel steering is delayed. As a result, reduction in the component of forepart turning motion of the truck attributable to rear-wheel steering is suppressed, compared with the case where the rear wheels are steered at earlier timing, and the forepart turning performance of the truck is improved. Further, since the loadage is small, the traveling stability of the truck is not excessively lowered. Furthermore, when the driver slowly operates the steering wheel, the delay time becomes shorter. Thus, the forepart turning performance is not unnecessarily increased, and the turning stability is improved.

On the other hand, when the loadage of the truck is great, the first-order lag process is performed using a small time constant T. Therefore, the degree of response delay of the rear-wheel steering is small and the timing for initiating the rear-wheel steering is advanced. Consequently, the component of forepart turning motion of the truck lessens, thus improving the traveling stability. Further, when the driver quickly operates the steering wheel, the delay time is prolonged and thus proper forepart turning performance is obtained.

The proportional constant K is controlled in response to the vehicle speed. Accordingly, the forepart turning performance in medium-speed region is improved, and also the response of the vehicle body to the operation of the steering wheel and the convergence thereof are improved in high-speed region.

The following is a description of a rear-wheel steering control apparatus according to a second embodiment of the present invention.

The apparatus of this embodiment is characterized in that the proportional constant K related to the first-order lag transfer function $G(s)=K/(1+Ts)$, which determines the rear-wheel steering angle output $\theta r$ corresponding to the front-wheel steering angle input $\theta f$, is increased with increase in the loadage of a vehicle. This thereby improves the vehicle traveling stability when the vehicle carries a large loadage. In other respects, the construction and operation of the apparatus of the second embodiment are identical to those of the apparatus of the first embodiment. Therefore, explanation of the construction and operation of the apparatus is partly omitted.

Figure 8:
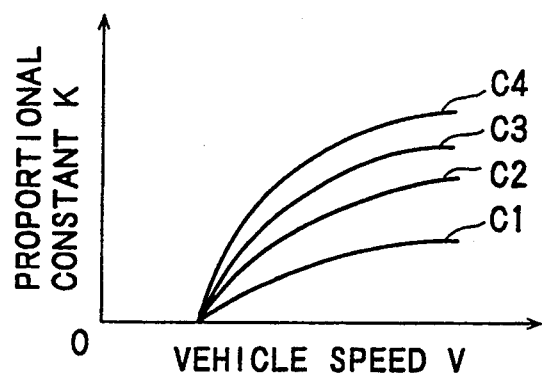
FIG. 8 is a graph showing an example of a vehicle speed-loadage-proportional constant map used for the calculation of the proportional constant K in the rear-wheel steering control apparatus according to a second embodiment of the present invention.

In connection with the feature mentioned above, a memory in the controller 95 of the apparatus stores a vehicle speed-loadage-proportional constant map, as shown in FIG. 8 by way of example. In the map of FIG. 8, a plurality of, e.g., four, vehicle speed-proportional constant curves C1 to C4 are set corresponding to four loadages W1 to W4 (W1<W2<W3<W4), respectively. As in the vehicle speed-proportional constant map (FIG. 6) of the first embodiment, each of the vehicle speed-proportional constant curves are set such that the proportional constant K increases with increase in the vehicle speed V in medium- and high-speed regions above a predetermined vehicle speed, e.g., about 30 km/h. Further, the four vehicle speed-proportional constant curves C1 to C4 are set such that a curve associated with a greater loadage specifies a larger value for the proportional constant K with respect to an identical vehicle speed. Specifically, according to the curves C1 to C4 associated with the loadages W1 to W4, respectively, the values of the proportional constant K vary respectively within ranges of about "0" to "0.1", about "0" to "0.15", about "0" to "0.25", and about "0" to "0.3" with change in the vehicle speed V.

The main point in the operation of the apparatus according to this embodiment resides in that, when setting the target rear-wheel steering angle by the controller 95, a proportional constant K matching with both the vehicle speed V and the loadage W is calculated. In this case, when the detected value of the loadage W falls within the range between Wi and Wi+1 (i=1, 2 or 3), an interpolation process is carried out based on curves Ci and Ci+1. Thereby, a proportional constant K matching with both the loadage W and the vehicle speed V is obtained. In other respects, the operation of the apparatus is identical with that previously explained regarding the apparatus of the first embodiment.

In brief, the controller 95 performs a first-order lag process on the front-wheel steering angle $\theta f$ calculated from the steering-wheel angle $\theta_H$, using the time constant T matching with the loadage W. It then multiplies the front-wheel steering angle $\theta f'$, obtained through the first-order lag process, by the proportional constant K derived as described above, to obtain a target rear-wheel steering angle $\theta r$. Then, the controller 95 controls the actuation of the control valve 82 in such a manner that the deviation of the actual rear-wheel steering angle $\theta ra$ from the target rear-wheel steering angle $\theta r$ becomes zero, thereby steering the rear wheels 18.

According to the rear-wheel steering described above, when the loadage of the truck is small, the first-order lag process is performed on the front-wheel steering angle $\theta f$ by using a large time constant T. Thereby, the timing for starting the rear-wheel steering is delayed and the forepart turning performance of the truck is improved. Further, since the proportional constant K is set to a small value, the steering angle ratio of the front and rear wheels, and thus the rear-wheel steering angle, lessens. On the other hand, when the loadage of the truck is great, the first-order lag process is performed using a small time constant T, whereby the timing for initiating the rear-wheel steering is advanced and the traveling stability of the vehicle is improved. Further, since the proportional constant K is set to a large value, the rear-wheel steering angle increases. As a result, variations in the vehicle operating characteristics responsive to the magnitude of the loadage are compensated for, and thus the traveling stability is ensured.

The present invention is not limited to the first and second embodiments described above and can be modified in various ways.

For example, although the foregoing description of the first and second embodiments is based on the assumption that the apparatus of the present invention is installed in a truck, of which the overall weight and thus the behavior change greatly depending on whether the truck is carrying goods or not (i.e. a load), the present invention can be applied to various types of motor vehicles other than a truck, such as a car for examole.

In the foregoing embodiments, the load acting upon the rear axle of the vehicle is detected as the loadage W, in consideration of the phenomenon that the operational stability at the time when the load is placed on the front or rear side of the deck is similar to that at the time when the loadage is small or great, respectively. Instead, the loadage W may be determined from the results of detection of the loads acting upon the front and rear axles, respectively.

Figure 9:
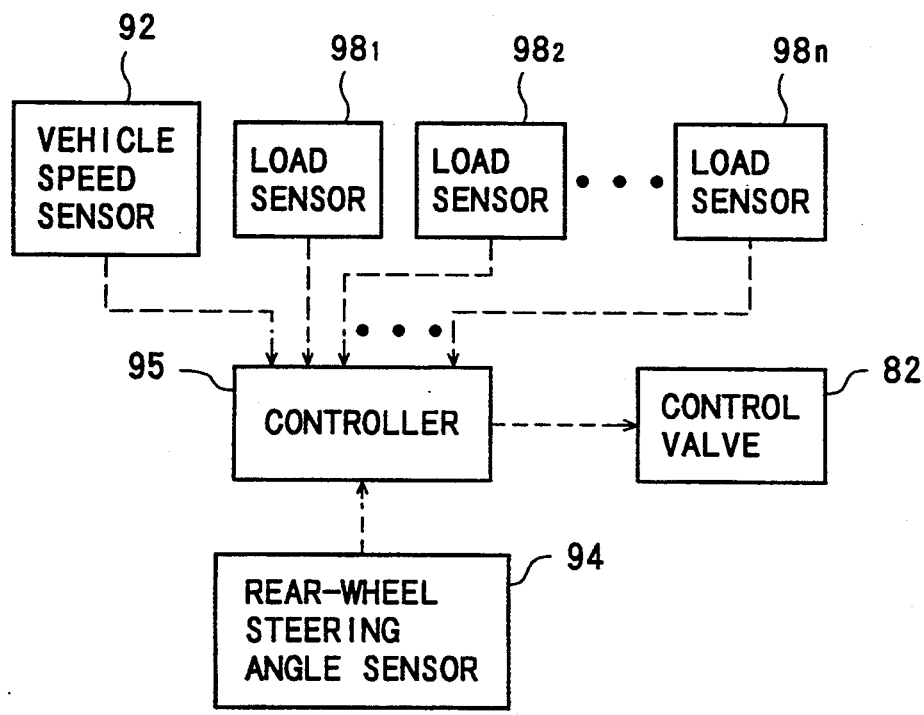
FIG. 9 is a block diagram showing a principal part of a rear-wheel steering control apparatus according to a modification of the present invention.

Further, the loadage W may be detected in the following manner: First, n sensor outputs are supplied from n load sensors (indicated at $98_1$, $98_2$, ..., $98_n$ in FIG. 9), which are contained in the individual seats or at various parts of the deck of a vehicle, for example, to the controller 95. Thereupon, the controller 95 obtains a present load weight based on the n sensor outputs and then computes, as the loadage W, a load factor (%) equal to the ratio of the present load weight to the prescribed loading capacity of the vehicle. In this case, the time constant T related to the first-order lag process of the front-wheel steering angle is set such that it decreases with an increase in the load factor. Also, the proportional constant K is set such that it increases with an increase in the load factor, if necessary.

In the foregoing embodiments, the loadage-time constant map is set such that the time constant T decreases linearly with an increase in the loadage W. However, it may be set in such a manner that the time constant T decreases along a curve.

From the above-described embodiments of the present invention, it is apparent that the present invention may be modified as would occur to one of ordinary skill in the art without departing from the spirit and scope of the present invention which should be defined solely by the appended claims. All such modifications as would be obvious to one of ordinary skill in the art should not be regarded as a departure from the spirit and scope of the invention, and should be included within the scope of the invention as defined solely by the appended claims.

What is claimed is:

1. A rear-wheel steering control apparatus comprising:
   front-wheel steering angle detecting means for detecting a steering angle $\theta f$ of front wheels of a vehicle;
   movable load detecting means for detecting a movable load of the vehicle;
   rear-wheel steering means for steering rear wheels of the vehicle; and
   control means for controlling operation of said rear-wheel steering means in accordance with the detected front wheel steering angle and the detected movable load to steer the rear wheels at a set steering angle of a phase direction identical to the detected steering angle of the front wheels, said control means setting a rear-wheel steering angle matching the detected front-wheel steering angle, and setting a first-order response delay, by which response of the set rear-wheel steering angle is delayed with respect to a steering of the front wheels, such that a degree of the first-order response delay decreases with an increase in the detected movable load.

2. The rear-wheel steering control apparatus according to claim 1, wherein said control means controls operation of said rear-wheel steering means in accordance with the front-wheel steering angle $\theta f$ and by means of a transfer function G(s), and sets an output $\theta r$ for said rear-wheel steering means such that $\theta r = G(s).\theta f$, said transfer function G(s) being given by $G(s) = K/(1+Ts)$, where K is a proportional constant, T is a delay time constant, and s is a Laplace operator, said control means decreasing the time constant T in accordance with a decrease in the detected movable load.

3. The rear-wheel steering control apparatus according to claim 2, further comprising vehicle speed detecting means for detecting a speed of the vehicle, wherein said control means increases the proportional constant K in accordance with an increase in the detected vehicle speed.

4. The rear-wheel steering control apparatus according to claim 2, wherein said control means increases the proportional constant K in accordance with an increase in the detected movable load.

5. The rear-wheel steering control apparatus according to claim 1, wherein said movable load detecting means detects a load on a rear axle of the vehicle.

6. The rear-wheel steering control apparatus according to claim 1, wherein said movable load detecting means detects a load factor of the vehicle.

7. A rear-wheel steering control method for steering rear wheels of a vehicle in a phase direction identical to that of front wheels, comprising the steps of:
   (a) detecting a steering angle $\theta f$ of the front wheels;
   (b) detecting a movable load of the vehicle;
   (c) setting a rear-wheel steering angle to match the detected front-wheel steering angle, and setting a first-order response delay, by which response of the set rear-wheel steering angle is delayed with respect to a steering of the front wheels, such that a degree of the first-order response delay decreases with an increase in the detected movable load; and
   (d) steering the rear wheels in accordance with said delayed set rear wheel steering angle of step (c).

8. The rear-wheel steering control method according to claim 7, wherein said step (c) includes generating an output $\theta r$ in accordance with the front-wheel steering angle $\theta f$ and by means of a transfer function G(s), and setting the output $\theta r$ such that $\theta r = G(s).\theta f$, said transfer function G(s) being given by $G(s) = K/(1+Ts)$, where K is a proportional constant, T is a delay time constant, and s is a Laplace operator, the time constant T being decreased in accordance with a decrease in the detected movable load.

9. The rear-wheel steering control method according to claim 8, further comprising the step of (e) detecting a speed of the vehicle, wherein said step (c) includes increasing the proportional constant K in accordance with an increase in the detected vehicle speed.

10. The rear-wheel steering control method according to claim 8, wherein said step (c) includes increasing the proportional constant K in accordance with an increase in the detected movable load.

11. The rear-wheel steering control method according to claim 7, wherein said step (b) includes detecting a load on a rear axle of the vehicle.

12. The rear-wheel steering control method according to claim 7, wherein said step (b) includes detecting a load factor of the vehicle.

13. A rear-wheel steering control apparatus comprising:
   front wheel steering angle detecting means for detecting a steering angle $\theta f$ of front wheels of a vehicle;
   movable load detecting means for detecting a movable load of the vehicle; and
   control means for steering rear wheels of the vehicle at a steering angle, equal to the detected front wheel steering angle and delayed by a first order response delay, a degree of the first order response delay decreasing with an increase in the detected movable load.

14. The rear-wheel steering control apparatus of claim 13, wherein the control means steers the rear wheels at a steering angle $\theta r$ in accordance with the detected front wheel steering angle $\theta f$ and a transfer function G(s) such that $\theta r = G(s) . \theta f$, wherein said transfer function $G(s) = K/(1+Ts)$, K being a proportional constant, s being a Laplace operator, and T being a delay time constant decreasing in accordance with a decrease in the detected movable load.

15. The rear-wheel steering control apparatus of claim 14, further comprising:
   vehicle speed detecting means for detecting a speed of the vehicle, the control means increasing the proportional constant K in accordance with an increase in the detected vehicle speed.

16. The rear-wheel steering control apparatus of claim 14, wherein the control means increases the proportional constant K in accordance with an increase in the detected movable load.

17. The rear-wheel steering control apparatus of claim 13, wherein the movable load detecting means detects a load on a rear axle of the vehicle.

18. The rear-wheel steering control apparatus of claim 13, wherein the movable load detecting means detects a load factor of the vehicle.

* * * * *